(12) United States Patent
Iraschko

(10) Patent No.: US 7,694,784 B2
(45) Date of Patent: Apr. 13, 2010

(54) ADJUSTING APPARATUS FOR A PNEUMATICALLY ACTUATED DISC BRAKE

(75) Inventor: Johann Iraschko, Schweitkirchen (DE)

(73) Assignee: Knorr-Bremse Systeme fuer Nutzfahrzeuge GmbH, Munich (DE)

( * ) Notice: Subject to any disclaimer, the term of this patent is extended or adjusted under 35 U.S.C. 154(b) by 151 days.

(21) Appl. No.: 11/859,995

(22) Filed: Sep. 24, 2007

(65) Prior Publication Data

US 2008/0217125 A1 Sep. 11, 2008

Related U.S. Application Data

(63) Continuation of application No. PCT/EP2006/002024, filed on Mar. 6, 2006.

(30) Foreign Application Priority Data

Mar. 24, 2005 (DE) .................. 10 2005 014 428
Aug. 31, 2005 (DE) .................. 10 2005 041 344

(51) Int. Cl.
*F16D 65/14* (2006.01)

(52) U.S. Cl. .................. 188/196 D; 188/72.7

(58) Field of Classification Search ............ 188/71.9, 188/196 D, 71.8, 71.7, 72.7
See application file for complete search history.

(56) References Cited

U.S. PATENT DOCUMENTS

| 4,350,228 | A | | 9/1982 | Luepertz |
| 5,353,896 | A | | 10/1994 | Baumgartner et al. |
| 5,379,867 | A | * | 1/1995 | Macke et al. ............... 188/71.9 |
| 5,568,845 | A | * | 10/1996 | Baumgartner et al. ...... 188/71.9 |
| 6,213,255 | B1 | | 4/2001 | Neuwirth |
| 7,484,602 | B2 | * | 2/2009 | Iraschko et al. ........ 188/196 BA |

FOREIGN PATENT DOCUMENTS

| DE | 197 29 024 C1 | 1/1999 |
| EP | 0 225 791 A1 | 6/1987 |
| EP | 0 566 008 A1 | 10/1993 |
| GB | 2 332 027 A | 6/1999 |
| WO | WO 91/19115 A1 | 12/1991 |

OTHER PUBLICATIONS

International Search Report dated May 4, 2006 with English translation of relevant portion (Four (4) pages).

* cited by examiner

*Primary Examiner*—Melanie Torres
(74) *Attorney, Agent, or Firm*—Crowell & Moring LLP

(57) ABSTRACT

An adjusting apparatus for a pneumatically actuated disc brake, in particular for arrangement in a rotatable spindle, having an overload coupling and a unidirectional coupling, is distinguished by the fact that the unidirectional coupling has a rolling-body coupling and friction clutches which are arranged on both sides of the rolling-body coupling.

16 Claims, 3 Drawing Sheets

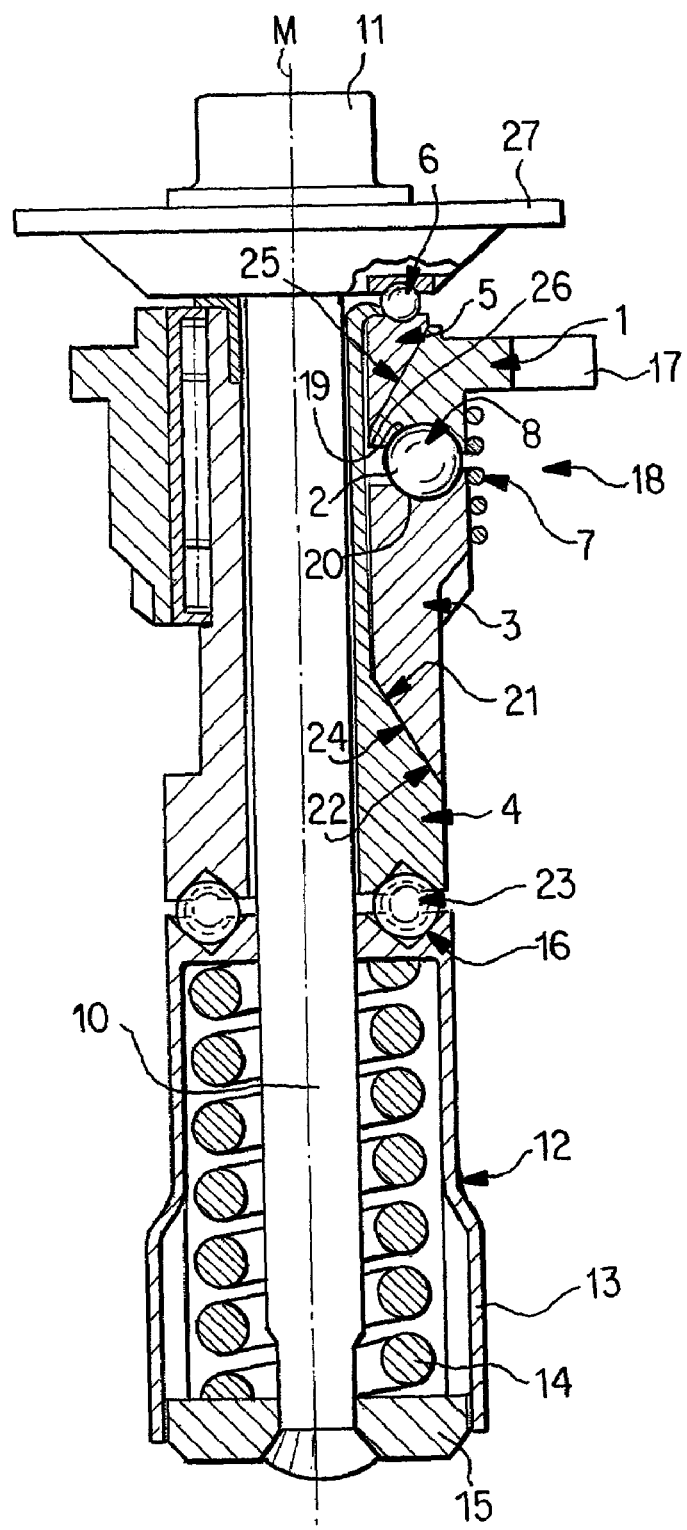
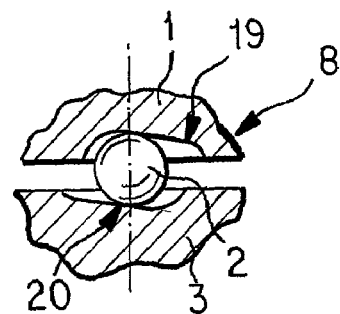
Fig. 1b
Fig. 1a

ADJUSTING APPARATUS FOR A PNEUMATICALLY ACTUATED DISC BRAKE

CROSS-REFERENCE TO RELATED APPLICATIONS

This application is a continuation of PCT International Application No. PCT/EP2006/002024, filed on Mar. 6, 2006, which claims priority under 35 U.S.C. §119 to German Application Nos. 10 2005 014 428.4, filed Mar. 24, 2005 and 10 2005 041 344.7, filed Aug. 31, 2005, the entire disclosures of which are expressly incorporated by reference herein.

BACKGROUND AND SUMMARY OF THE INVENTION

The invention relates to an adjusting apparatus for a pneumatically actuated disc brake.

Pneumatically actuated disc brakes have, presently, become standard in heavy commercial vehicles.

The disc brake, as a rule, is assigned a pneumatically actuated brake cylinder having a piston rod, which acts on an application device for the disc brake in order to apply the brake. Known types of construction are the sliding-caliper disc brake, the hinged-caliper disc brake, and the fixed caliper disc brake.

Disc brakes of this type require a mechanical step-up (force-multiplier) in order to generate the required application force, since the force of the pneumatically loaded brake cylinder is restricted on account of the pressure level (at the present time, approximately 10 bar) and the limited overall size of the brake cylinders.

In the pneumatically actuated disc brakes known at the present time, step-up ratios of between 10:1 and 20:1 are found. The piston strokes of the brake cylinders range between 50 and 70 mm, thus resulting in an application travel of about 4 mm in order to press the brake lining onto the brake disc.

The frictional material thickness of the brake linings usually lies in the region of 20 mm. Since two linings are installed, this results, not taking into account the disc wear, in a wear travel of about 40 mm. This wear travel is greater by a multiple than the actual application travel for applying the brake. There is therefore the need to adjust the brake according to the lining wear by way of a wear adjusting apparatus.

The state of the art provides an automatically operating wear adjustment, which ensures that what is known as the lift play, that is to say the gap between the brake linings and the brake disc in the unactuated state, is kept constant independently of the state of wear and the wear behavior of the brake linings.

In one type of construction of known disc brakes, adjusting apparatuses are accommodated concentrically in the cavity of a threaded spindle and are driven eccentrically by the brake lever via a drive element (shift finger) (see, for example, DE 19 729 024 C1 or EP 0 566 008 A1 or WO 91/19115).

During braking actions, the brake lever coupled to the piston rod of the brake cylinder executes a rotational movement. Before the rotational movement of the lever is introduced into the adjuster via the coupling mechanism for adjustment (shift fork and shift finger), an idle travel, as it is known, has to be overcome. This travel is critical for the size of the lift play, since, during this movement, adjustment is not activated and the application travel then constitutes the lift play.

After the idle travel has been overcome, the adjuster is set in rotational movement, an adjusting operation being initiated as a result of coupling to the threaded spindle.

A basic component of the wear adjuster is the unidirectional coupling, which may be designed, for example, as a clamping roller freewheel. What is achieved by this free wheel, occasionally also designated as a unidirectional coupling, is that the adjuster can be rotated by the brake lever in the feed direction only and is not reset (left-hand side in FIG. 1). Having a rolling-body coupling in an unidirectional coupling is known from WO 91/19115 (FIG. 3). However, this arrangement is still relatively costly and is to be improved further in terms of its operating reliability.

A clamping roller freewheel is a precision component, which requires a high accuracy of the corresponding components for satisfactory functioning. The high accuracy of the operating elements results in a relatively high outlay in terms of cost for producing the components.

The present invention provides a wear adjusting apparatus with which the production costs are reduced while operational reliability continues to be good.

According to the invention, a wear adjusting apparatus is provided for a pneumatically actuated disc brake, in particular for arrangement in a rotatable spindle of the disc brake, having an overload coupling and an unidirectional coupling. The unidirectional coupling has a rolling-body coupling and friction clutches, which are arranged on both sides of the rolling-body coupling.

Advantageous refinements are described and claimed herein.

According to the invention, the unidirectional coupling is implemented with the requirement of only a low outlay in terms of production costs, without this being accompanied by a restriction in functioning or an increase in overall space.

An inventive disc brake is also provided which incorporates the wear adjusting apparatus according to the invention.

In summary, the following advantages arise:
simple construction;
lower accuracy requirements to be met by the individual parts;
low tolerance sensitivity;
production of the components by non-cutting forming;
high adaptability owing to diverse parameter setting possibilities;
settable moment of friction in the "overrun direction" by use of a torsion spring; and
low operating hysteresis, since all the movable parts are mounted on ball bearings.

BRIEF DESCRIPTION OF THE DRAWINGS

The invention is described in more detail below with reference to the drawing in which:

FIGS. 1a and 1b illustrate a section through a known adjusting apparatus (left-hand side of the center line M) and an adjusting apparatus according to the invention (right-hand side of the center line M) (FIG. 1a) and a section through the region of a rolling-body on the drive and the driven bush of the invention (FIG. 1b)

DETAILED DESCRIPTION OF THE DRAWINGS

Figure 2:
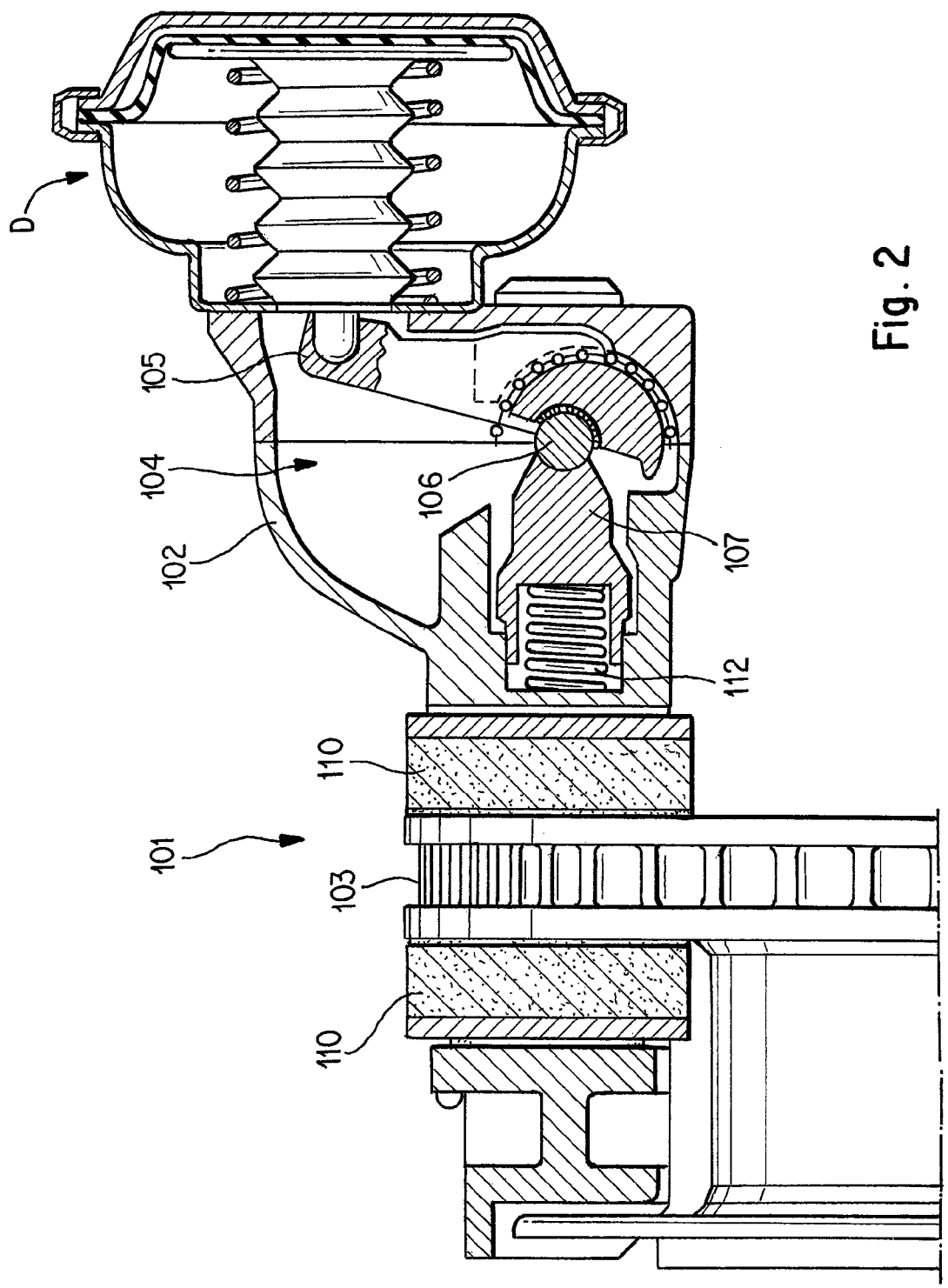
FIGS. 2 and 3 are generally diagrammatic cross-sectional and top views of a known disc brake, which is basically suitable for receiving the adjusting apparatus according to FIG. 1.
Figure 3:
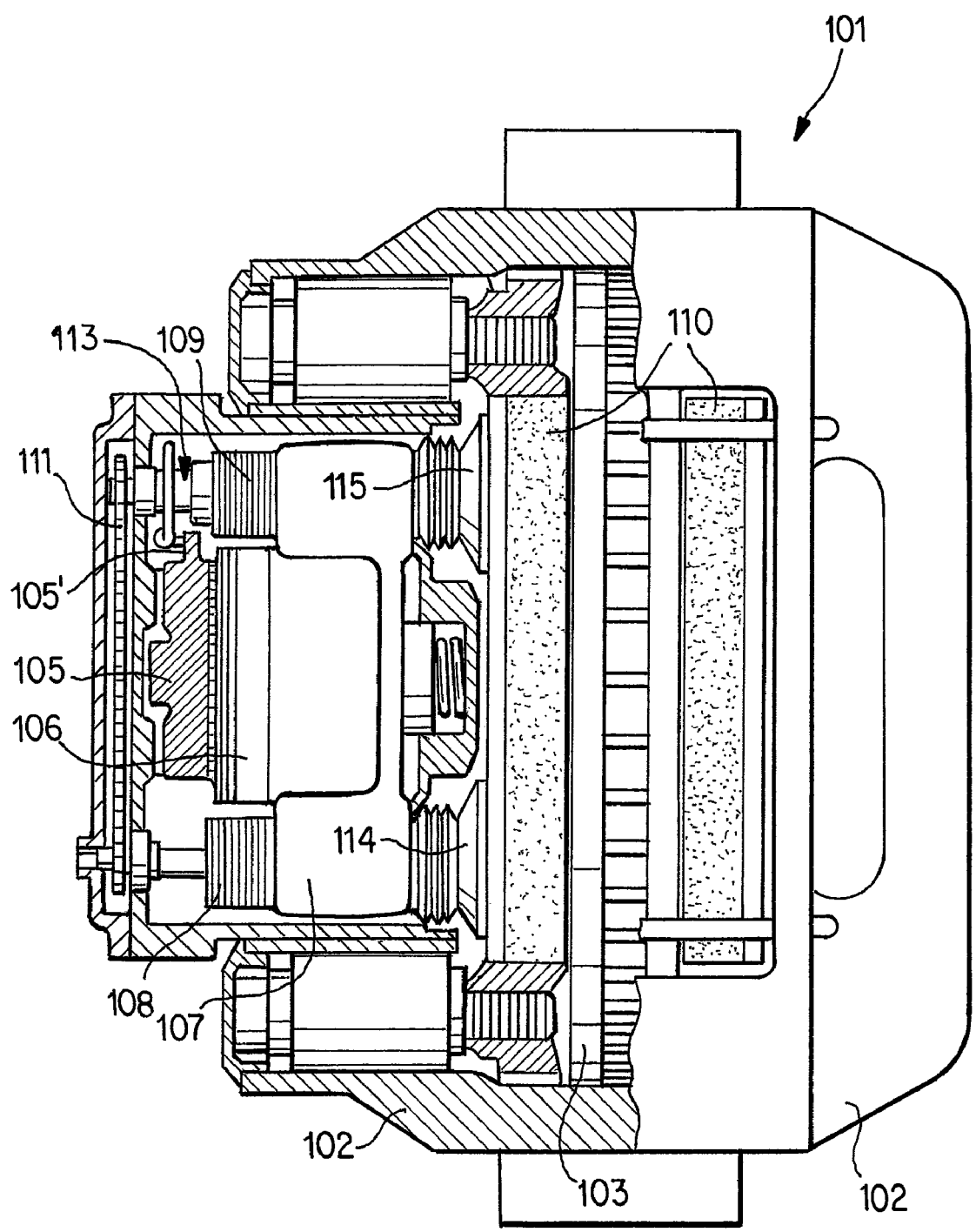

The construction and functioning of the pneumatic disc brake according to FIGS. 2 and 3 will first be outlined briefly.

The disc brake 101 has a caliper housing 102, which straddles an internally vented brake disc 103. On one side of the brake disc 103 is provided an application device 104 having a rotary actuating lever 105, which is mounted on plain bearings and which is moved by a piston rod of a compressed air cylinder D and (see, in this respect, the dashed position of the lever 105) itself actuates or rotates an eccentric 106 which, in turn, cooperates, here via a cross-piece 107, with two actuating spindles 108, 109 against which one of the brake linings 110 is supported. The two actuating spindles 108, 109 are coupled by way of a synchronizing device, here a chain, 111. A spring 112 between the cross-piece 107 and the caliper housing 102 ensures a prestress of the cross-piece 107 in the direction of the rotary lever 105.

The cross-piece 107 has on each of its two lateral sides a bore, which is provided with an internal thread and into which the actuating spindles 108 and 109 provided with external threads are screwed. A rotary drive 113 (which is designed here according to the prior art, but does not entail any differences as regards the basic principle of actuation of the rotary drive) projects into the recess of the upper actuating spindle 109 in FIG. 3 and is actuated by the rotary lever 105 or by a pin 105' integrally formed on the latter and, during the brake application stroke, causes the actuating spindle 109, and consequently, via the chain 111, also the other actuating spindle 108, to be screwed in the direction of approach to the brake disc 103.

When the cylinder D is acted upon with compressed air, the rotary lever 5 is pivoted, thus rotating the eccentric 106 and displacing the cross-piece 107 toward the brake disc 103, so that the spindles 108, 109 move in the direction of the one lining 110. The thrust pieces 114, 115 at the ends of the actuating spindles 108, 109 consequently push one of the brake linings 110 toward the brake disc 103. In this case, the brake caliper 102 mounted axially displaceably on a brake carrier (not illustrated) is also displaced (slides) and takes up the other brake lining 110 so that the brake is applied.

The adjusting apparatus 1 of FIG. 1, which would be suitable, for example, for arrangement in one of the actuating spindles 108, 109 of the disc brake shown in FIGS. 2 and 3, will be described below.

The adjusting apparatus 1 has a continuous central spindle 10, on which is formed at one axial end, for example, an external reverse-rotation polygon 11 which, for example, can pass through a bore in the brake caliper housing (not illustrated here) and which is utilized for the reverse rotation of the adjusting apparatus by hand, for example when the brake linings (not illustrated here) are exchanged.

On the opposite end of the spindle 10 is placed a toothed sleeve 12, on the outer circumference of which are formed at least one or more teeth 13, which teeth engage into a corresponding groove of the surrounding rotary spindle which serves for the actual adjustment of the brake lining wear.

When the toothed sleeve 12 is rotated, it takes up the surrounding actuating spindle. The actuating spindle, in that regard, is arranged on the, for example, two teeth 13 so as to be axially displaceable, but nonrotatable in relation to the teeth 13.

The toothed sleeve 12 is prestressed by way of a spring 14 between one of its axial ends and a disc 15, fastened on the spindle 10, at its other axial end.

Furthermore, the toothed sleeve 12 is supported on a bearing sleeve 4 via a ball ramp arrangement 16.

A shift fork 17 serves in a manner known per se for transmitting the movement of the rotary lever of the application device of the disc brake to the adjusting apparatus.

This shift fork 17 is formed on the outer circumference of a drive bush 1 which constitutes a first part of a unidirectional coupling 18.

The unidirectional coupling 18 has a rolling-body coupling 8 and friction clutches 24, 25 arranged on both sides of the rolling-body coupling 8.

In particular, the unidirectional coupling 18 has the following construction.

It has the drive bush 1 with the shift fork 17, with a preferably conical friction surface 26 and a plurality of clamping pockets 19. A plurality of clamping bodies 2 (normally balls) engage into the latter.

The clamping bodies 2 are followed by a driven bush 3 with a plurality of clamping pockets 20, which, furthermore, has a friction surface 21 at the opposite end of the driven bush.

The driven bush 3 is followed axially by a bearing sleeve 4 having a friction surface 22, which matches the driven bush 3, at the other end of which the ball ramp coupling (overload coupling 16) with its rolling bodies 23 is arranged. Furthermore, at the opposite end of the drive bush 1, a bush 5 with a friction surface matching the driven bush 3 is provided, which is connected (for example wobble-riveted) to an inner extension of the bearing sleeve 4. The extension surrounds the spindle 10 and extends axially into this region. Furthermore, an axial ball bearing 6 is arranged between the bush 5 and a flange 26.

A torsion spring 7 partially surrounds the drive 1 and the driven bush 3 and engages with one end into the drive bush 1 and with the other end into the driven bush 3. The clamping pockets of the drive and the driven bush 1, 3 are designed as inclined planes (ramps) (right-hand detail in FIG. 1). The surrounding torsion spring 7 allows or causes relative rotation between the drive bush 1 and the driven bush 3.

The direction of rotation is oriented such that the clamping balls 2 in the clamping pockets 19 roll on their ramp contours (FIG. 1*b*). The two bushes 1 and 3 are thereby pressed apart axially until the friction surfaces of the two bushes 1 and 3 come to bear at their ends or counter faces facing away from one another.

This arrangement functions as follows.

Rotation in the Application Direction

When a rotational movement is initiated by the shift fork 17, during which the clamping bodies or balls 2 are moved in the direction of the ramp, an axial force arises which, in turn, brings about a non-positive connection in the two friction clutches 18 and 25. Since the friction clutches 24, 25 and the ramp coupling 8 are coordinated with one another such that self-locking occurs ($M_{Fric} > M_{Coupling}$), the rotational movement is introduced from the drive bush 1 as far as the ball ramp coupling 16 and from there via the toothed sleeve 12 into the threaded spindles (i.e., the surrounding actuating spindles).

Rotation in the Release Direction

When a rotational movement is initiated by the shift fork 17, during which the clamping bodies or balls 2 are moved down from the ramp, the axial force and consequently the frictional force are reduced until rotation in the two friction clutches occurs. This results in the moment of friction of the friction clutch being lower than the torque of the prestressed torsion spring.

The free wheel function is thus ensured by way of the movement sequence outlined.

| Table of Reference Symbols | |
| --- | --- |
| Drive bush | 1 |
| Clamping body | 2 |
| Driven bush | 3 |
| Bearing sleeve | 4 |
| Bush | 5 |
| Axial ball bearing | 6 |
| Torsion spring | 7 |
| Rolling-body coupling | 8 |
| Spindle | 10 |
| External reverse-rotation polygon | 11 |
| Toothed sleeve | 12 |
| Teeth | 13 |
| Spring | 14 |
| Disc | 15 |
| Overload coupling | 16 |
| Shift fork | 17 |
| Unidirectional coupling | 18 |
| Clamping pockets | 19 |
| Clamping pockets | 20 |
| Friction surface | 21 |
| Friction surface | 22 |
| Rolling-body | 23 |
| Friction clutches | 24, 25 |
| Friction surface | 26 |
| Flange | 27 |
| Disc brake | 101 |
| Brake caliper housing | 102 |
| Brake disc | 103 |
| Application device | 104 |
| Rotary actuating lever | 105 |
| Eccentric | 106 |
| Cross-piece | 107 |
| Actuating spindles | 108, 109 |
| Brake linings | 110 |
| Chain | 111 |
| Spring | 112 |
| Rotary drive | 113 |
| Thrust pieces | 114, 115 |
| Compressed air cylinder | D |

The invention claimed is:

1. A disc brake component of a pneumatically actuated disc brake that includes a rotatable spindle for applying a braking force, the component comprising:
a wear adjusting apparatus arrangeable within the rotatable spindle of the disc brake;
wherein the wear adjusting apparatus comprises an overload coupling and a unidirectional coupling, the unidirectional coupling have a rolling-body coupling and friction clutches, a first of said friction clutches being arranged axially on one side of the rolling body coupling and a second of said friction clutches being arranged axially on the other side of the rolling body coupling.

2. The component according to claim 1, further comprising:
a spindle;
a toothed sleeve placed on the spindle, the toothed sleeve being prestressed via a spring in a direction of the overload coupling;
a bearing sleeve arranged on a side of the overload coupling lying opposite the toothed sleeve.

3. The component according to claim 1, further comprising a drive bush of the unidirectional coupling, wherein a shift fork is formed on the drive bush.

4. The component according to claim 1, wherein the unidirectional coupling comprises:
a drive bush having a shift fork, the drive bush having a conical friction surface at one axial end and a plurality of clamping pockets at the other axial end;
a plurality of clamping bodies; and
a driven bush having a plurality of clamping pockets at an end facing the drive bush, into which plurality of clamping pockets the clamping bodies engage, the driven bush having a friction surface at an opposite end from the clamping pockets.

5. The component according to claim 4, wherein the unidirectional coupling further comprises:
a bearing sleeve having a friction surface matching a geometry of the friction surface of the driven bush, the overload coupling having rolling bodies beginning at an other end of the bearing sleeve;
at an opposite end of the drive bush, a further bush having a friction surface matching the driven bush is connected to an inner extension of the bearing sleeve.

6. The component according to claim 5, wherein the unidirectional coupling further comprises:
an axial ball bearing arranged between the further bush and a flange;
a torsion spring engaging with one end into the drive bush and with another end into the driven bush;
wherein the clamping pockets of the drive bush and the driven bush are operatively configured as an inclined ramp.

7. The component according to claim 1, wherein the rolling body coupling and the friction clutches are coordinated with one another such that self-locking occurs ($M_{Fric} > M_{Coupling}$) during rotation in an adjustment direction, whereby rotational movement is introduced from a drive bush to the overload coupling and, via a toothed sleeve, into the rotary spindle.

8. The component according to claim 4, wherein the rolling body coupling and the friction clutches are coordinated with one another such that self-locking occurs ($M_{Fric} > M_{coupling}$) during rotation in an adjustment direction, whereby rotational movement is introduced from the drive bush to the overload coupling and, via a toothed sleeve, into the rotary spindle.

9. The component according to claim 5, wherein the rolling body coupling and the friction clutches are coordinated with one another such that self-locking occurs ($M_{Fric} > M_{Coupling}$) during rotation in an adjustment direction, whereby rotational movement is introduced from the drive bush to the overload coupling and, via a toothed sleeve, into the rotary spindle.

10. The component according to claim 6, wherein the rolling body coupling and the friction clutches are coordinated with one another such that self-locking occurs ($M_{Fric} > M_{Coupling}$) during rotation in an adjustment direction, whereby rotational movement is introduced from the drive bush to the overload coupling and, via a toothed sleeve, into the rotary spindle.

11. A pneumatically actuated disc brake, comprising:
a caliper housing;
a brake application unit for applying a braking force, the brake application unit including a rotatable spindle;
a wear adjusting apparatus arranged in the rotatable spindle of the disc brake, the wear adjusting apparatus comprising:
an overload coupling and a unidirectional coupling, the unidirectional coupling have a rolling-body coupling and friction clutches, a first of said friction clutches being arranged axially on one side of the rolling body coupling and a second of said friction clutches being arranged axially on the other side of the rolling body coupling.

12. The disc brake according to claim 11, wherein the wear adjusting apparatus comprises:
a spindle;
a toothed sleeve placed on the spindle, the toothed sleeve being prestressed via a spring in a direction of the overload coupling;

a bearing sleeve arranged on a side of the overload coupling lying opposite the toothed sleeve.

13. The disc brake according to claim 11, wherein the wear adjusting apparatus further comprises a drive bush of the unidirectional coupling, wherein a shift fork is formed on the drive bush.

14. The disc brake according to claim 11, wherein the unidirectional coupling comprises:
   a drive bush having a shift fork, the drive bush having a conical friction surface at one axial end and a plurality of clamping pockets at the other axial end;
   a plurality of clamping bodies; and
   a driven bush having a plurality of clamping pockets at an end facing the drive bush, into which plurality of clamping pockets the clamping bodies engage, the driven bush having a friction surface at an opposite end from the clamping bodies.

15. The disc brake according to claim 14, wherein the unidirectional coupling further comprises:
   a bearing sleeve having a friction surface matching a geometry of the friction surface of the driven bush, the overload coupling having rolling bodies beginning at an other end of the bearing sleeve;
   at an opposite end of the drive bush, a further bush having a friction surface matching the driven bush is connected to an inner extension of the bearing sleeve.

16. The disc brake according to claim 15, wherein the unidirectional coupling further comprises:
   an axial ball bearing arranged between the further bush and a flange;
   a torsion spring engaging with one end into the drive bush and with another end into the driven bush;
   wherein the clamping pockets of the drive bush and the driven bush are operatively configured as an inclined ramp.

* * * * *